United States Patent
Chen et al.

(10) Patent No.: US 8,749,526 B2
(45) Date of Patent: Jun. 10, 2014

(54) OPTICAL SYSTEM AND CLICK DETECTION METHOD THEREFOR

(75) Inventors: Hsin Chia Chen, Hsin-Chu (TW); Chun Chen Chen, Hsin-Chu (TW); Yen Min Chang, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 178 days.

(21) Appl. No.: 13/180,841

(22) Filed: Jul. 12, 2011

(65) Prior Publication Data

US 2012/0007834 A1    Jan. 12, 2012

(30) Foreign Application Priority Data

Jul. 12, 2010  (TW) .............................. 99122906 A

(51) Int. Cl.
*G06F 3/042*    (2006.01)

(52) U.S. Cl.
USPC .......................................................... 345/175

(58) Field of Classification Search
CPC ..... G06F 3/041; G06F 3/0412; G06F 3/0414; G06F 3/042; G06F 3/0421; G06F 3/0487
USPC ................ 345/156–184; 178/18.09
See application file for complete search history.

(56) References Cited

U.S. PATENT DOCUMENTS

| | | | |
|---|---|---|---|
| 7,313,255 B2 | 12/2007 | Machida et al. | |
| 7,969,410 B2 * | 6/2011 | Kakarala | 345/156 |
| 8,270,677 B2 | 9/2012 | Ahn et al. | |
| 2006/0284856 A1 * | 12/2006 | Soss | 345/173 |
| 2009/0245574 A1 | 10/2009 | Ahn et al. | |
| 2010/0079411 A1 * | 4/2010 | Lee et al. | 345/175 |
| 2012/0026110 A1 * | 2/2012 | Yamano | 345/173 |

FOREIGN PATENT DOCUMENTS

| | | |
|---|---|---|
| CN | 101464750 A | 6/2009 |
| CN | 101551716 A | 10/2009 |
| TW | I270819 A | 1/2007 |
| TW | 200841227 A | 10/2008 |
| TW | 200931318 A | 7/2009 |
| TW | 200941313 A | 10/2009 |
| TW | 200945126 A | 11/2009 |
| TW | I326421 | 6/2010 |

\* cited by examiner

*Primary Examiner* — Dwayne Bost
*Assistant Examiner* — Larry Sternbane
(74) *Attorney, Agent, or Firm* — Lowe Hauptman & Ham, LLP

(57) ABSTRACT

The present invention provides a click detection method for an optical system including the steps of: acquiring an image frame and calculating a quality parameter thereof; in an initial state, maintaining the initial state when the quality parameter is smaller than or equal to a first threshold while transferring to a first touch state and counting a count value when the quality parameter is larger than the first threshold; and in the first touch state, maintaining the first touch state when the quality parameter is larger than or equal to a second threshold while identifying the count value when the quality parameter is smaller than the second threshold and identifying a single click and transferring to the initial state if the count value is within a first predetermined range. The present invention further provides an optical system.

16 Claims, 5 Drawing Sheets

OPTICAL SYSTEM AND CLICK DETECTION METHOD THEREFOR

CROSS REFERENCE TO RELATED APPLICATION

This application claims the priority benefit of Taiwan Patent Application Serial Number 099122906, filed on Jul. 12, 2010, the full disclosure of which is incorporated herein by reference.

BACKGROUND

1. Field of the Invention

This invention generally relates to an optical system and, more particularly, to an optical system for detecting click events and a click detection method therefor.

2. Description of the Related Art

To date, the optical mouse has become a necessary peripheral device of personal computer systems such that a user may execute a specific function, such as cursor control, single click or double click on an icon, by using the mouse. However, to a portable electronic device such as a laptop computer or a personal digital assistance (PDA), a mouse connected externally is inconvenient to use.

Therefore, the field provided an optical mouse which is directly installed on the portable electronic device such that a user does not need to carry an external mouse with him or her thereby increasing the convenience of portable electronic devices.

For example U.S. Pat. No. 7,313,255 provides a click event detection system that sequentially detects a lift-up motion and a put-down motion, and identifies whether a time different between a lift-up time and a put-down time is within a predetermined time limit to accomplish the detection of a click event.

Please refer to FIG. 1A, it shows a flow chart of detecting a click motion of the conventional detection system, wherein the click motion may be a lift-up motion or a put-down motion. Please refer to FIG. 1B, it shows a flow chart of detecting a click event of the conventional detection system, wherein a lift-up time is checked when a lift-up motion is detected and then the detection system continuously detects another click motion until a put-down motion is detected and a put-down time will be checked at the same time. When a time difference between the lift-up time and the put-down time is within a predetermined time limit, a click event is identified.

However, the conventional detection system described above has at least the following problems: (1) the mechanism of identifying a click event by detecting a lift-up motion followed by a put-down motion sequentially does not fully match the instinct of human race; (2) a put-down motion might be detected long after the occurrence of a lift-up motion but the detection system will continuously identify whether a put-down motion is occurred thereby wasting system resources.

Accordingly, the present invention further provides an optical system and a click detection method therefor that may identify a single click, a double click and even a multiple click event.

SUMMARY

The present invention provides an optical system and a click detection method therefor that perform the identification of click events only when the system state changes thereby realizing the real time operation of the system.

The present invention further provides an optical system and a click detection method therefor that terminate the identification of click events if no further state transfer occurs within a predetermined count range after entering a touch state such that the system needs not to wait the occurrence of click events.

The present invention provides a click detection method for an optical system including the steps of; controlling an optical system to operate in an initial state; periodically acquiring an image frame and calculating a quality parameter thereof; comparing the quality parameter and a first threshold to accordingly control the optical system to perform a state transfer; periodically acquiring an image frame and calculating the quality parameter thereof and counting a count value when the optical system transfers to a first touch state; comparing the quality parameter and a second threshold to accordingly control the optical system to perform the state transfer; and identifying the count value when a comparison result of comparing the quality parameter and the second threshold shows that the optical system performs the state transfer and identifying a single click and transferring the optical system to the initial state if the count value is within a first predetermined range; wherein, compared to the second threshold, the first threshold represents a better quality of the image frame.

According to another aspect, after the step of comparing the quality parameter and a second threshold to accordingly control the optical system to perform the state transfer, the click detection method for an optical system of the present invention further includes the steps of: identifying the count value when a comparison result of comparing the quality parameter and the second threshold shows that the optical system performs the state transfer and transferring the optical system to an untouched state and periodically acquiring an image frame and calculating the quality parameter thereof and recounting if the count value is within a second predetermined range; comparing the quality parameter and the first threshold to accordingly control the optical system to perform the state transfer; identifying the count value when the optical system transfers to a second touch state and periodically acquiring an image frame and calculating the quality parameter thereof and recounting if the count value is within a third predetermined range; comparing the quality parameter and the second threshold to accordingly control the optical system to perform the state transfer; and identifying the count value when the optical system transfers to the initial state again and identifying a double click if the count value is within a fourth predetermined range.

According to another aspect, after the step of comparing the quality parameter and a second threshold to accordingly control the optical system to perform the state transfer, the click detection method for an optical system of the present invention further includes the steps of: identifying the count value when a comparison result of comparing the quality parameter and the second threshold shows that the optical system performs the state transfer and transferring the optical system to an untouched state and periodically acquiring an image frame and calculating the quality parameter thereof and recounting if the count value is within a second predetermined range; comparing the quality parameter and the first threshold to accordingly control the optical system to perform the state transfer; and identifying the count value when the optical system transfers to a second touch state and identifying a double click if the count value is within a third predetermined range.

The present invention further provides a click detection method for an optical system including the steps of acquiring an image frame and calculating a quality parameter thereof; in an initial state, maintaining the initial state when the quality parameter is smaller than or equal to a first threshold while transferring to a first touch state and counting a count value when the quality parameter is larger than the first threshold; and in the first touch state, maintaining the first touch state when the quality parameter is larger than or equal to a second threshold while identifying the count value when the quality parameter is smaller than the second threshold and identifying a single click and transferring to the initial state if the count value is within a first predetermined range.

According to another aspect, the click detection method for an optical system according to the present invention further includes the steps of; in the first touch state, identifying the count value when the quality parameter is smaller than the second threshold and transferring to an untouched state and recounting if the count value is within a second predetermined range; in the untouched state, maintaining the untouched state when the quality parameter is smaller than or equal to the first threshold while identifying the count value when the quality parameter is larger than the first threshold and transferring to a second touch state and recounting if the count value is within a third predetermined range; and in the second touch state, maintaining the second touch state when the quality parameter is larger than or equal to the second threshold while identifying the count value when the quality parameter is smaller than the second threshold and identifying a double click and transferring to the initial state if the count value is within a fourth predetermined range.

According to another aspect, the click detection method for an optical system according to the present invention further includes the steps of: in the first touch state, identifying the count value when the quality parameter is smaller than the second threshold and transferring to an untouched state and recounting if the count value is within a second predetermined range; in the untouched state, maintaining the untouched state when the quality parameter is smaller than or equal to the first threshold while identifying the count value when the quality parameter is larger than the first threshold and identifying a double click and transferring to a second touch state if the count value is within a third predetermined range; and in the second touch state, maintaining the second touch state when the quality parameter is larger than or equal to the second threshold while transferring to the initial state when the quality parameter is smaller than the second threshold.

To achieve above objects, the present invention further provides an optical system including a detection interface, a light source, a counter, an image sensor and a processing unit. The detection interface has an upper surface for the finger to click and/or to move thereon. The light source is configured to illuminate the detection interface. The counter is for counting a count value. The image sensor is configured to receive reflected lights from the finger upon the detection interface to generate an image frame. The processing unit is for calculating a quality parameter according to the image frame and identifying a single click according to the following steps: in an initial state, maintaining the initial state when the quality parameter is smaller than or equal to a first threshold while transferring to a first touch state and controlling the counter to count when the quality parameter is larger than the first threshold; and in the first touch state, maintaining the first touch state when the quality parameter is larger than or equal to a second threshold while identifying the count value when the quality parameter is smaller than the second threshold and identifying a single click if the count value is within a first predetermined range.

According to another aspect, the processing unit of the optical system according to the present invention further identifies a double click according to the following steps: in the first touch state, identifying the count value when the quality parameter is smaller than the second threshold and transferring to an untouched state and controlling the counter to recount if the count value is within a second predetermined range; in the untouched state, maintaining the untouched state when the quality parameter is smaller than or equal to the first threshold while identifying the count value when the quality parameter is larger than the first threshold and transferring to a second touch state and controlling the counter to recount if the count value is within a third predetermined range; and in the second touch state, maintaining the second touch state when the quality parameter is larger than or equal to the second threshold while identifying the count value when the quality parameter is smaller than the second threshold and identifying a double click if the count value is within a fourth predetermined range.

According to another aspect, the processing unit of the optical system according to the present invention further identifies a double click according to the following steps: in the first touch state, identifying the count value when the quality parameter is smaller than the second threshold and transferring to an untouched state and controlling the counter to recount if the count value is within a second predetermined range; and in the untouched state, maintaining the untouched state when the quality parameter is smaller than or equal to the first threshold while identifying the count value when the quality parameter is larger than the first threshold value and identifying a double click if the count value is within a third predetermined range.

In the optical system and click detection method therefor, the counting is stopped when the count value exceeds a predetermined range and a click event will not be identified even a state transfer occurs at this moment so as to prevent the system from continuously waiting the occurrence of click events.

In the optical system and click detection method therefor, the first threshold is associated with a higher image quality so that the error identification caused by brightness variation due to environmental interference can be avoided; and the second threshold is associated with a lower image quality so as to obtain higher detection reliability.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1A:
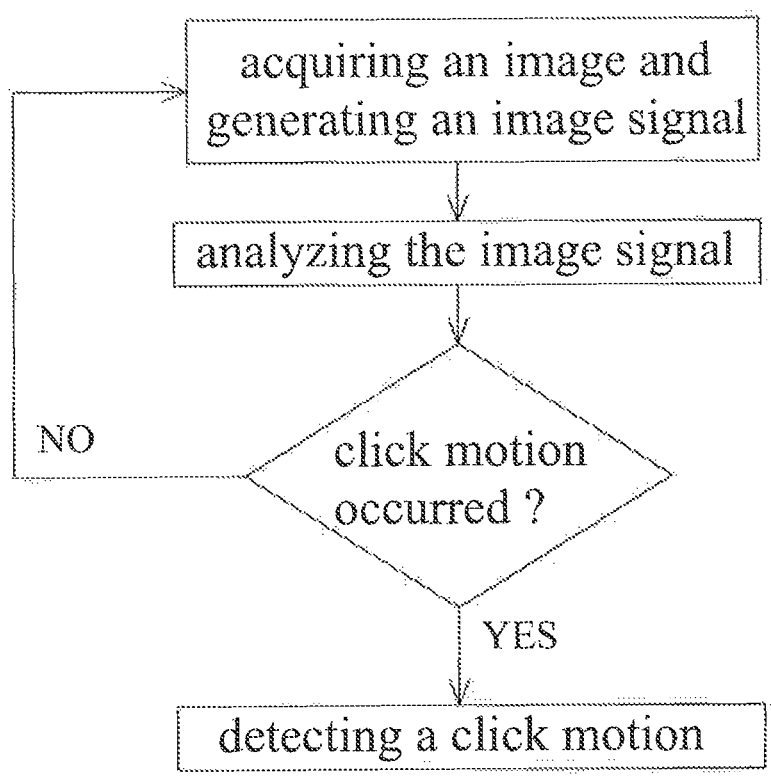
FIG. 1A shows a flow chart of detecting a click motion in conventional click event detection method.
Figure 1B:
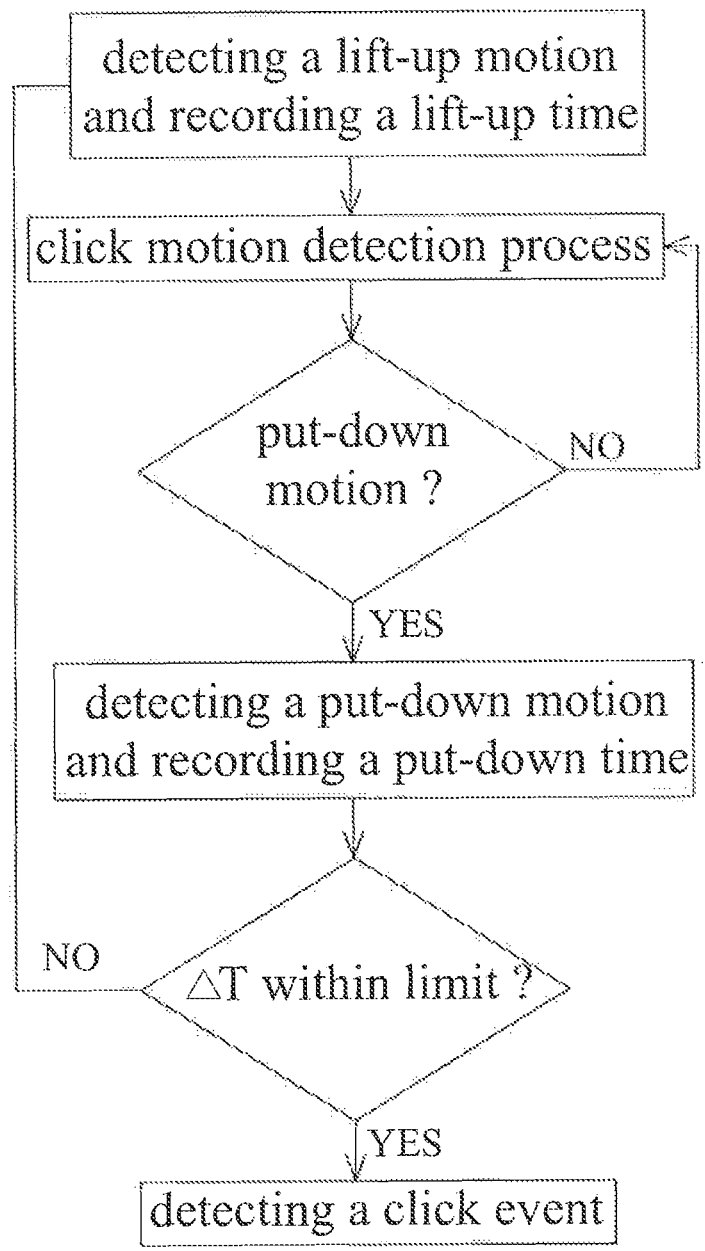
FIG. 1B shows a flow chart of detecting a click event in conventional click event detection method.

In the drawings of the present invention, only a part of the components are shown and other components that are not directly pertinent to the present invention are omitted.

Figure 2:
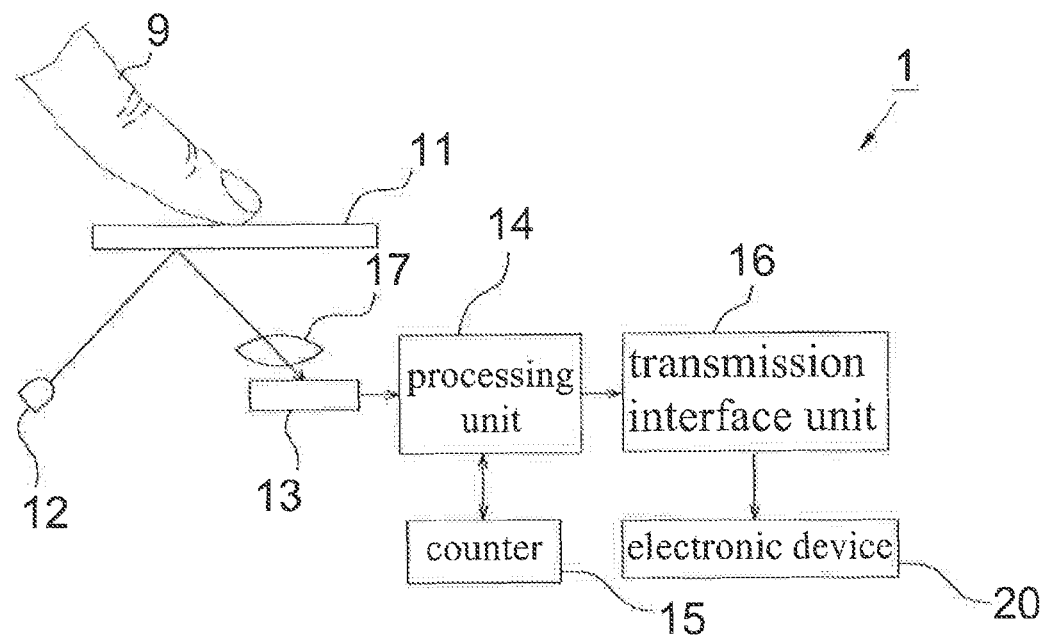
FIG. 2 shows a block diagram of the optical system according to an embodiment of the present invention.

Please refer to FIG. 2, it shows a schematic diagram of the optical system according to an embodiment of the present invention. The optical system 1 is configured to detect a touch state and/or a relative movement of a finger 9 with respect to the optical system 1, and further to identify a click event, including a single click, a double click or a multiple click, according to a variation of the touch state, or to calculate a displacement according to the relative movement. It is appreciated that, the finger 9 may also be other parts of the human body and is not limited to a finger. The touch state of the finger 9 and the optical system 1 is determined according to a comparison result of comparing a quality threshold and a quality parameter retrieved from the image frame acquired by the optical system 1. The displacement may be obtained according to a relationship, e.g. correlation, between a plurality of image frames acquired by the optical system 1 or according to other conventional methods. When a value of the quality parameter is higher, the quality of the image frame acquired is higher. Then the optical system 1 may calculate the displacement or identify the click event more correctly.

Several embodiments of the quality parameter may be referred to commonly owned U.S. Pat. Nos. 7,142,695, 7,444, 006 and 7,116,801, or referred to published papers by Y. S. Chen and F. C. Meng, "Image quality measurement based on statistics of activity regions," Journal of the Chinese Institute of Engineers, Vol. 24, No. 3, pp. 379-388 (2001) or by N. Zhang, A. E. Vladar, M. T. Postek, and B. Larrabee, "A kurtosis-based statistical measure for two-dimensional processes and its application to image sharpness," Proceedings of Section of Physical and Engineering Sciences of American Statistical Society, pp. 4730-4736, 2003.

The optical system 1 may couple to an electronic device 20 to accordingly control the electronic device 20 to execute a specific function according to the click event detected or the displacement calculated. For example, the electronic device 20 may be controlled to select a specific icon or execute a specific program according the click motion, to perform the cursor control according to the displacement or to perform other functions that are executable by a conventional mouse, wherein the optical system 1 may be physically separated from or built inside the electronic device 20. The electronic device 20 may be, for example a notebook, a cell phone or a portable digital assistance (PDA), but the present invention is not limited thereto.

The optical system 1 includes a detection interface 11, a light source 12, an image sensor 13, a processing unit 14, a counter 15 and a transmission interface unit 16.

The detection interface 11 has an upper surface for a finger 9 to click or to move thereon, and the material thereof is preferably transparent to the light emitted by the light source 12. The light source 12 may be any suitable light source, such as an IR light source or an ultraviolet light source, and the light source may be formed by one light emitting diode (LED) or by arranging a plurality of LEDs, but the present invention is not limited thereto. When a light source of a specific band is used, it is able to prevent the optical system 1 from being affected by the light of other bands. The image sensor 13 is configured to receive reflected lights from the finger 9 upon the detection interface 11 to generate image frames, which include micro texture features of the finger 9 and will be transmitted to the processing unit 14 for processing. The image sensor 13 may be, for example, a CCD image sensor, a COMS image sensor or the like.

The processing unit 14 may be any processor for processing data of the image frame, such as a microprocessor or a microcontroller. The processing unit 14 calculates a quality parameter according to the content of the image frame and/or calculates a displacement according to a relationship between image frames, compares the quality parameter and the quality threshold to determine a state of the optical system 1, and identifies a click event according to a change of the system state. The processing unit 14 is coupled to the counter 15 to control the counter 15 to start counting or recount each time the optical system 1 changing its state (implementations will be illustrated hereinafter).

The transmission interface unit 16 receives the click event signal and the displacement from the processing unit 14 and transmits received information to the electronic device 20 for corresponding control, wherein the transmission interface unit 16 may communicate with the electronic device 20 wirelessly or electrically. In addition, the optical system 1 may further include a light guiding unit 17 to guide the reflected lights from the detection interface 11 to the image sensor 13 to increase the sensing efficiency thereof. In addition, the space relationship between every component and the size of each component in the optical system 1 are not limited to those shown in FIG. 2, and those shown therein are exemplary embodiments rather than limitations to the present invention.

Figure 3:
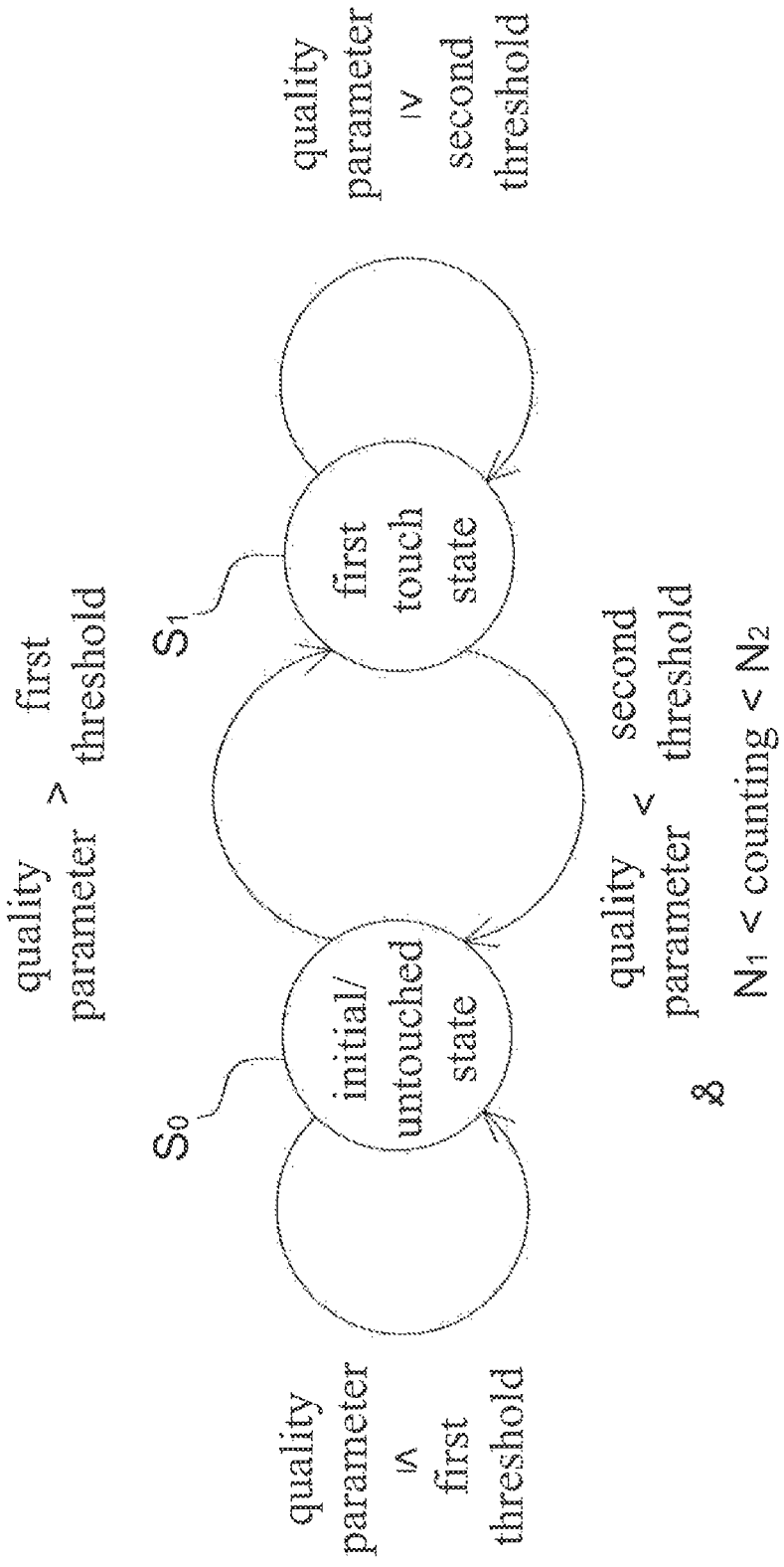
FIG. 3 shows an operational schematic diagram of detecting a single click event in the click detection method for an optical system according to an embodiment of the present invention.

Please refer to FIG. 3, it shows an operational schematic diagram of detecting a single click in the click detection method for an optical system according to the present invention, wherein the optical system 1 includes an initial state/untouched state $S_0$ and a first touch state $S_1$. For example, when the optical system 1 is turned on, woken up from sleep state or restarts to operate after a period of time, the optical system 1 automatically enters the initial state/untouched state $S_0$, i.e. the finger 9 is not in contact with the detection interface 11. At this moment, the image sensor 13 periodically acquires image frames with a sample frequency, and the processing unit 14 calculates a quality parameter of every image frame and compares each quality parameter with a first threshold to accordingly control the optical system 1 to perform a state transfer. When the quality parameter is smaller than or equal to the first threshold, the optical system 1 maintains the initial state $S_0$. When the quality parameter is larger than the first threshold, the processing unit 14 controls the optical system 1 to transfer to the first touch state $S_1$ and the counter 15 to start counting.

In the first touch state $S_1$, the image sensor 13 periodically acquires image frames with the sample frequency, and the processing unit 14 calculates a quality parameter of every image frame and compares each quality parameter with a second threshold to accordingly control the optical system 1 to perform the state transfer. At this moment, the counter 15 may count a count value synchronous to the sample frequency or count with a frequency larger or smaller than the sample frequency. When the quality parameter of the image frame is lamer than or equal to the second threshold, the optical system 1 maintains the first touch state $S_1$. When the quality parameter of the image frame is smaller than the second threshold, the optical system 1 performs the state transfer. At this moment, the processing unit 14 identifies whether the count value counted by the counter 15 is within a first predetermined range $N_1$ to $N_2$, which may be a range of a time interval or a count value. If the count value is within the first predetermined range $N_1$ to $N_2$, the processing unit 14 identifies a single click event and controls the optical system 1 to transfer to the initial state $S_0$. In addition, in the first touch state $S_1$, when identifying that the count value is outside of the first predetermined range $N_1$ to $N_2$, the processing unit 14 controls the counter 15 to stop counting and terminates the click detection, i.e. even though the optical system 1 occurs a state transfer now, the processing unit 14 does not perform the identification of single click event.

In this embodiment, the first threshold is set to be higher than the second threshold. The reason of selecting a higher first threshold is to prevent error identification from the brightness variation caused by environmental interference and the reason of selecting a lower second threshold is to obtain a higher reliability. In addition, in the first touch state $S_1$, the optical system 1 may further perform other functional operations, such as calculating a displacement according to a relative variation between the finger 9 and the detection interface 11 so as to accordingly control the motion of a cursor shown on a display (not shown) of the electronic device 20, wherein the calculation of a displacement may use the correlation between image frames. In another embodiment, the first threshold may not be higher than the second threshold. For example, the first threshold may be lower than the second threshold after numerical calculation. The spirit of the present invention is that, compared to the second threshold, the first threshold denotes a better quality of the image frame.

In other words, in the initial state $S_0$ of FIG. 3, when a comparison result of comparing the quality parameter and the first threshold shows that the optical system 1 performs the state transfer (the quality parameter may be larger or smaller than the first threshold herein), the processing unit 14 controls the optical system 1 to transfer to the first touch state $S_1$ and controls the counter 15 to start counting. In the first touch state $S_1$, when a comparison result of comparing the quality parameter and the second threshold shows that the optical system 1 performs the state transfer (the quality parameter may be larger or smaller than the second threshold herein), the processing unit 14 identifies whether the count value counted by the counter 15 is within the first predetermined range $N_1$ to $N_2$; and if the count value is within the first predetermined range $N_1$ to $N_2$, the processing unit 14 identifies a single click event and controls the optical system 1 to transfer to the initial state $S_0$ again.

Figure 4:
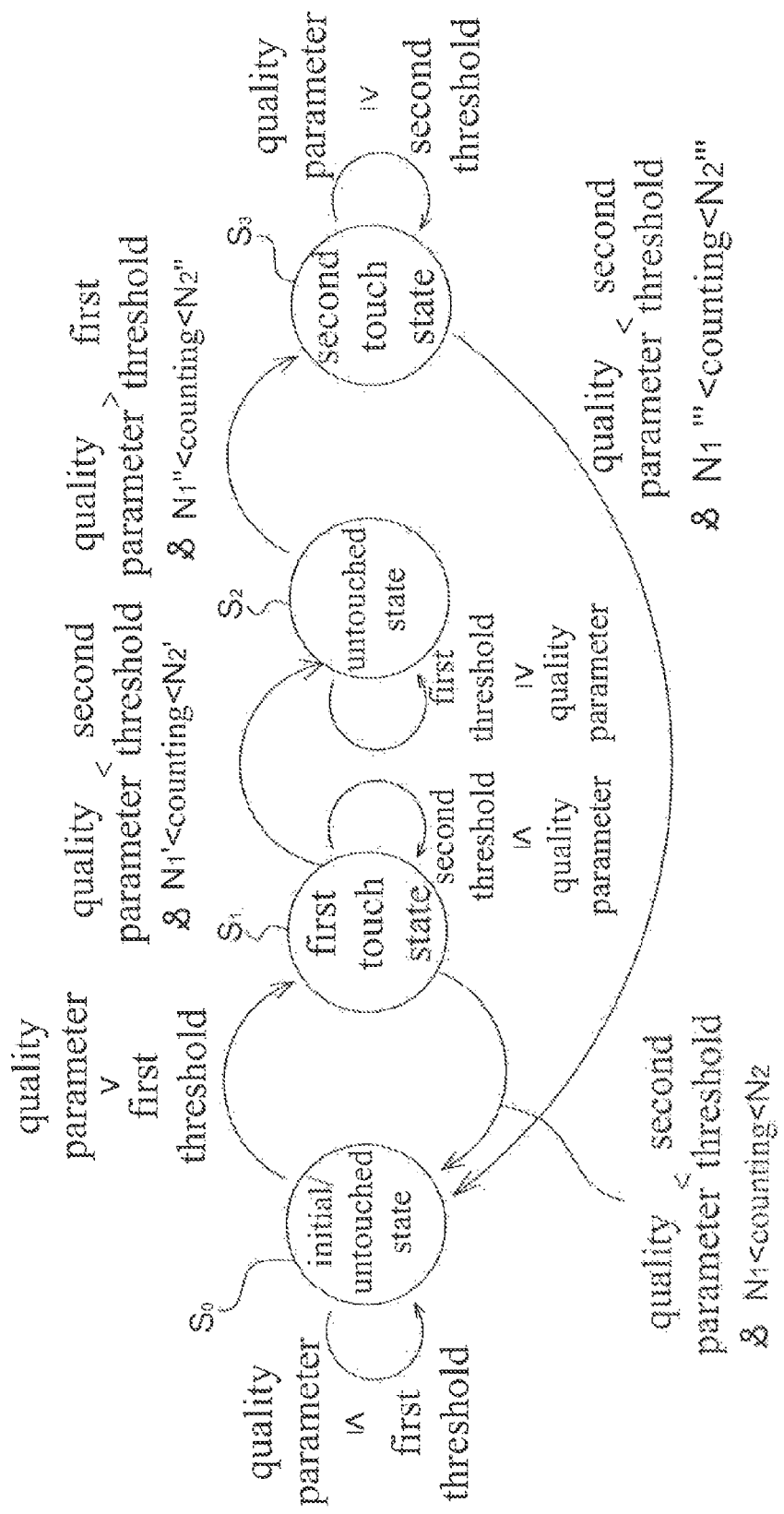
FIG. 4 shows an operational schematic diagram of detecting a single click event or a double click event in the click detection method for an optical system according to an embodiment of the present invention.

Please refer to FIG. 4, it shows an operational schematic diagram of detecting a single click or a double click in the click detection method for an optical system according to the present invention, wherein the optical system 1 includes an initial state/untouched state $S_0$, a first touch state $S_1$, an untouched state $S_2$ and a second touch state $S_3$, wherein the initial state/untouched state $S_0$ and the untouched state $S_2$ denote the finger 9 is not in contact with the detection interface 11 and they may be defined as two states in actual operation. Similarly, the first touch state $S_1$ and the second touch state $S_3$ denote the finger 9 is in contact with the detection interface 11 and they may be defined as two states in actual operation.

When being turned on, woken up from sleep state or restarting to operate after a period of time, the optical system 1 automatically enters the initial state/untouched state $S_0$, i.e. the finger 9 is not in contact with the detection interface 11, and the operation of this state is similar to the initial state/untouched state $S_0$ shown in FIG. 3 and thus details thereof will not be repeated herein.

In the first touch state $S_1$, the image sensor 13 acquires image frames with the sample frequency periodically, and the processing unit 14 calculates a quality parameter of every image frame and compares each quality parameter with a second threshold to accordingly control the optical system 1 to perform a state transfer. When the quality parameter of the image frame is larger than or equal to the second threshold, the optical system 1 maintains the first touch state $S_1$. When the quality parameter of the image frame is smaller than the second threshold, the optical system 1 performs the state transfer. At this moment, the processing unit 14 identifies whether the count value counted by the counter 15 is within a first predetermined range $N_1$ to $N_2$ or within a second predetermined range $N_{1'}$ to $N_{2'}$, wherein the predetermined ranges may be ranges of a time interval or a counter number. If the count value is within the first predetermined range $N_1$ to $N_2$, the processing unit 14 identifies a single click event and controls the optical system 1 to transfer to the initial state $S_0$, in addition, if the count value is within the second predetermined range $N_{1'}$ to $N_{2'}$, the processing unit 14 controls the optical system 1 to transfer to the untouched state $S_2$ and controls the counter 15 to recount. In addition, in the first touch state $S_1$, when identifying that the count value is outside of the first predetermined range $N_1$ to $N_2$ or the second predetermined range $N_{1'}$ to $N_{2'}$ (for example selecting one of the first and second predetermined ranges having a larger range), the processing unit 14 controls the counter 15 to stop counting and to terminate the click detection. That is, even though the optical system 1 has a state transfer, the processing unit 14 does not perform the identification of click event. Similarly in this embodiment, in the first touch state $S_1$ the optical system 1 may further perform other functional operations, such as calculating a displacement according to a relative variation between the finger 9 and the detection interface 11.

In the untouched state $S_2$, the image sensor 13 acquires image frames with the sample frequency periodically, and the processing unit 14 calculates a quality parameter of every image frame and compares each quality parameter with the first threshold to accordingly control the optical system 1 to perform the state transfer. When the quality parameter of the image frame is smaller than or equal to the first threshold, the optical system 1 maintains the untouched state $S_2$. When the quality parameter of the image frame is larger than the first threshold, the optical system 1 performs the state transfer. At this moment, the processing unit 14 identifies whether a count value counted by the counter 15 is within a third predetermined range $N_{1''}$ to $N_{2''}$, which may be a range of a time interval or a count value. If the count value is within the third predetermined range $N_{1''}$ to $N_{2''}$, the processing unit 14 controls the optical system to transfer to the second touch state $S_3$ and controls the counter 15 to recount. In addition, in the untouched state $S_2$, when the count value is outside of the third predetermined range $N_{1''}$ to $N_{2''}$, the processing unit 14 controls the counter 15 to stop counting and controls the optical system 1 to terminate the click detection and to return to the initial state $S_0$. In this way, it is able to prevent the optical system 1 from waiting the occurrence of a state transfer thereby realizing the real time operation of the system and saving system resources.

When the optical system 1 is in the untouched state $S_2$ and the count value is within the third predetermined range $N_{1''}$ to $N_{2''}$, two options may be taken by the optical system 1 in this embodiment.

For the first option, when identifying that the quality parameter of the image frame is larger than the first threshold, the processing unit 14 controls the optical system 1 to transfer to the second touch state $S_3$. And if the count value is within the third predetermined range $N_{1'''}$ to $N_{2'''}$, a double click event is identified. Next in the second touch state $S_3$, the image sensor 13 acquires image frames with the sample frequency periodically, and the processing unit 14 calculates a quality parameter of every image frame and compares each quality parameter with the second threshold to accordingly control the optical system 1 to perform the state transfer. When the quality parameter is larger than or equal to the second threshold, the processing unit 14 controls the optical system 1 to maintain the second touch state $S_3$. When the quality parameter is smaller than the second threshold, the processing unit 14 controls the optical system 1 to transfer to the initial state $S_0$.

For the second option, when identifying that the quality parameter of the image frame is larger than the first threshold, the processing unit 14 controls the optical system 1 to transfer to the second touch state $S_3$ and controls the counter 15 to recount. In the second touch state $S_3$, the image sensor 13 acquires image frames with the sample frequency periodically, and the processing unit 14 calculates a quality parameter of every image frame and compares each quality parameter with the second threshold to accordingly control the optical system 1 to perform the state transfer. When the quality parameter of the image frame is larger than or equal to the second threshold, the optical system 1 maintains the second touch state $S_3$. When the quality parameter of the image frame is smaller than the second threshold, the optical system 1 performs the state transfer. At this moment, the processing unit 14 identifies whether a count value counted by the counter 15 is within a fourth predetermined range $N_{1'''}$ to $N_{2'''}$, which may be a rage of a time interval or a count value. If the count value is within the fourth predetermined range $N_{1'''}$ to $N_{2'''}$, the processing unit 14 identifies a double click event and controls the optical system 1 to transfer to the initial state $S_0$.

In addition, in the second touch state $S_3$, when the count value is outside of the fourth predetermined range $N_{1'''}$ to $N_{2'''}$, the counting will be stopped and the click detection will be terminated. That is, even though the optical system 1 has a state transfer, the processing unit 14 does not perform the identification of double click event. In the second touch state $S_3$, the optical system 1 may further perform other functional operations, such as calculating a displacement according to a relative variation between the finger 9 and detection interface 11.

Similarly, as described in FIG. 3, the first threshold may be lower than the second threshold according to different definitions and quality parameters utilized. The spirit of the present invention is that, compared to the second threshold, the first threshold denotes a better quality of the image frame.

Figure 5:
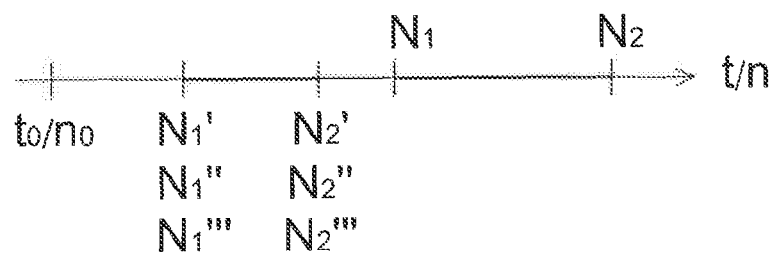
FIG. 5 shows a schematic diagram of every predetermined range of the count value used in the click detection method for an optical system according to the embodiment of the present invention.

Please refer to FIG. 5, it shows a schematic diagram of a relationship between the first predetermined range $N_1$ to $N_2$ and the second predetermined range $N_{1'}$ to $N_{2'}$ to the fourth predetermined range $N_{1'''}$ to $N_{2'''}$, wherein the transverse axis denotes time or count value. In one embodiment, if the counter 15 starts counting from $t_0$ or $n_0$, a time interval or a count value of the first predetermined range $N_1$ to $N_2$ is larger than that of the second predetermined range $N_{1'}$ to $N_{2'}$, the fourth predetermined range $N_{1'''}$ to $N_{2'''}$, and the second predetermined range $N_{1'}$ to $N_{2'}$ to the fourth predetermined range $N_{1'''}$ have an identical range. But the relationship between different predetermined ranges may be determined according to different applications and is not limited to that shown in FIG. 5.

In addition, the click detection method for an optical system of the present invention may also be adapted to identify a multiple click event similar to the implementation of FIG. 4.

As mentioned above, conventional methods for detecting click event still have the problem of having to wait for the occurrence of a click motion. The present invention further provides an optical system (FIG. 2) and click detection method therefore (FIGS. 3 and 4) that match the operation instinct better and only performs the identification of click event when the system state changes thereby being able to provide instant detection.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A click detection method for an optical system, the method comprising:
   acquiring an image frame and calculating a quality parameter thereof;
   in an initial state denoting a no-contact situation,
      maintaining the initial state when the quality parameter is smaller than or equal to a first threshold, and
      transferring to a first touch state denoting an in-contact situation and counting a count value when the quality parameter is larger than the first threshold; and
   in the first touch state,
      maintaining the first touch state when the quality parameter is larger than or equal to a second threshold, and
      when the quality parameter is smaller than the second threshold,
         identifying the count value,
         identifying a single click and transferring to the initial state when the count value is within a first predetermined range, and
         stopping counting the count value before transferring to the initial state when the count value exceeds the first predetermined range.

2. The click detection method as claimed in claim 1, wherein the second threshold is lower than the first threshold.

3. The click detection method as claimed in claim 1, wherein, in the first touch state when the quality parameter is larger than or equal to the second threshold, the click detection method further comprises:
   calculating a displacement according to a plurality of image frames.

4. The click detection method as claimed in claim 1, further comprising:
   terminating detection of click events when the count value is outside the first predetermined range.

5. The click detection method as claimed in claim 1, further comprising:
   in the first touch state,
      identifying the count value when the quality parameter is smaller than the second threshold, and
      transferring to an untouched state and recounting when the count value is within a second predetermined range;
   in the untouched state,
      maintaining the untouched state when the quality parameter is smaller than or equal to the first threshold, and
      when the quality parameter is larger than the first threshold,
         identifying the count value, and transferring to a second touch state and recounting when the count value is within a third predetermined range; and in the second touch state,
maintaining the second touch state when the quality parameter is larger than or equal to the second threshold, and
when the quality parameter is smaller than the second threshold,
identifying the count value, and
identifying a double click and transferring to the initial state when the count value is within a fourth predetermined range.

6. The click detection method as claimed in claim 5, further comprising:
in the untouched state, transferring to the initial state when the count value is outside the third predetermined range.

7. The click detection method as claimed in claim 5, further comprising:
in the second touch state, terminating detection of click events when the count value is outside the fourth predetermined range.

8. The click detection method as claimed in claim 1, further comprising:
in the first touch state,
identifying the count value when the quality parameter is smaller than the second threshold, and
transferring to an untouched state and recounting when the count value is within a second predetermined range;
in the untouched state,
maintaining the untouched state when the quality parameter is smaller than or equal to the first threshold, and
when the quality parameter is larger than the first threshold,
identifying the count value, and
identifying a double click and transferring to a second touch state when the count value is within a third predetermined range; and
in the second touch state,
maintaining the second touch state when the quality parameter is larger than or equal to the second threshold, and
transferring to the initial state when the quality parameter is smaller than the second threshold.

9. An optical system for detecting a click event by a finger, the optical system comprising:
a detection interface having an upper surface for the finger to click and/or to move thereon;
a light source configured to illuminate the detection interface;
a counter for counting a count value;
an image sensor configured to receive reflected light from the finger upon the detection interface to generate an image frame; and
a processing unit for calculating a quality parameter according to the image frame and identifying a click event, wherein the processing unit is configured to:
in an initial state denoting a no-contact situation,
maintain the initial state when the quality parameter is smaller than or equal to a first threshold, and
transfer to a first touch state denoting an in-contact situation and control the counter to count when the quality parameter is larger than the first threshold; and
in the first touch state,
maintain the first touch state when the quality parameter is larger than or equal to a second threshold, and
when the quality parameter is smaller than the second threshold,
identify the count value,
identify a single click when the count value is within a first predetermined range, and
control the counter to stop counting before identifying the single click when the count value exceeds the first predetermined range.

10. The optical system as claimed in claim 9, wherein the first threshold is larger than the second threshold.

11. The optical system as claimed in claim 9, wherein the processing unit is further configured to
in the first touch state,
identify the count value when the quality parameter is smaller than the second threshold, and
transfer to an untouched state and control the counter to recount when the count value is within a second predetermined range;
in the untouched state,
maintain the untouched state when the quality parameter is smaller than or equal to the first threshold, and
when the quality parameter is larger than the first threshold,
identify the count value,
transfer to a second touch state and control the counter to recount when the count value is within a third predetermined range; and
in the second touch state,
maintain the second touch state when the quality parameter is larger than or equal to the second threshold, and
when the quality parameter is smaller than the second threshold,
identify the count value, and
identify a double click when the count value is within a fourth predetermined range.

12. The optical system as claimed in claim 11, wherein, in the first touch state and the second touch state, the processing unit is further configured to calculate a displacement according to a plurality of image frames.

13. The optical system as claimed in claim 9, wherein the processing unit is further configured to
in the first touch state,
maintain the count value when the quality parameter is smaller than the second threshold, and
transfer to an untouched state and control the counter to recount when the count value is within a second predetermined range; and
in the untouched state,
maintain the untouched state when the quality parameter is smaller than or equal to the first threshold, and
when the quality parameter is larger than the first threshold value,
identify the count value, and
identify a double click when the count value is within a third predetermined range.

14. A click detection method for an optical system, the method comprising:
controlling the optical system to operate in an initial state denoting a no-contact situation;
periodically acquiring an image frame and calculating a quality parameter thereof;
comparing the quality parameter and a first threshold to accordingly control the optical system to perform a state transfer;

periodically acquiring an image frame and calculating the quality parameter thereof and counting a count value when the optical system transfers to a first touch state denoting an in-contact situation;

comparing the quality parameter and a second threshold to accordingly control the optical system to perform the state transfer; and when a comparison result of comparing the quality parameter and the second threshold shows that the optical system performs the state transfer,
  identifying the count value,
  identifying a single click and transferring the optical system to the initial state when the count value is within a first predetermined range, and
  stopping counting the count value before transferring to the initial state when the count value exceeds the first predetermined range.

15. The click detection method as claimed in claim 14, after the comparing the quality parameter and the second threshold to accordingly control the optical system to perform the state transfer, the click detection method further comprising:

identifying the count value when the comparison result of comparing the quality parameter and the second threshold shows that the optical system performs the state transfer, and transferring the optical system to an untouched state and periodically acquiring an image frame and calculating the quality parameter thereof and recounting when the count value is within a second predetermined range;

comparing the quality parameter and the first threshold to accordingly control the optical system to perform the state transfer;

identifying the count value when the optical system transfers to a second touch state, and periodically acquiring an image frame and calculating the quality parameter thereof and recounting when the count value is within a third predetermined range;

comparing the quality parameter and the second threshold to accordingly control the optical system to perform the state transfer; and identifying the count value when the optical system transfers to the initial state again, and identifying a double click when the count value is within a fourth predetermined range.

16. The click detection method as claimed in claim 14, after the comparing the quality parameter and the second threshold to accordingly control the optical system to perform the state transfer, the click detection method further comprising:

identifying the count value when the comparison result of comparing the quality parameter and the second threshold shows that the optical system performs the state transfer, and transferring the optical system to an untouched state and periodically acquiring an image frame and calculating the quality parameter thereof and recounting when the count value is within a second predetermined range;

comparing the quality parameter and the first threshold to accordingly control the optical system to perform the state transfer; and identifying the count value when the optical system transfers to a second touch state, and identifying a double click when the count value is within a third predetermined range.

* * * * *